US005994646A

United States Patent [19]

Broeksteeg et al.

[11] Patent Number: 5,994,646

[45] Date of Patent: Nov. 30, 1999

[54] SHIELDING BRAID TERMINATION FOR A SHIELDED ELECTRICAL CONNECTOR

[75] Inventors: Johannes Marcelus Broeksteeg, Buitenhof; Johannes Marinus Jacobus Den Otter, Rosmalen, both of Netherlands

[73] Assignee: The Whitaker Corporation, Wilmington, Del.

[21] Appl. No.: 08/981,879

[22] PCT Filed: Jul. 15, 1996

[86] PCT No.: PCT/IB96/00688

§ 371 Date: Dec. 30, 1997

§ 102(e) Date: Dec. 30, 1997

[87] PCT Pub. No.: WO97/04500

PCT Pub. Date: Feb. 6, 1997

[30] Foreign Application Priority Data

| | | | |
|---|---|---|---|
| Jul. 19, 1995 | [GB] | United Kingdom | 9514799 |
| Jan. 11, 1996 | [JP] | Japan | 9600564 |

[51] Int. Cl.[6] .......... H02G 15/02

[52] U.S. Cl. .......... 174/74 R; 174/75 C; 439/98

[58] Field of Search .......... 174/75 C, 78, 174/74 R; 439/98, 99

[56] References Cited

U.S. PATENT DOCUMENTS

| | | | |
|---|---|---|---|
| 3,321,732 | 5/1967 | Forney, Jr. | 439/98 |
| 3,600,499 | 8/1971 | Hibbs | 174/70 S |
| 3,923,367 | 12/1975 | Carter | 339/276 R |
| 4,600,263 | 7/1986 | CeChamp et al. | 339/177 R |
| 4,628,150 | 12/1986 | Luc | 174/88 C |
| 4,733,464 | 3/1988 | Gregorac | 29/867 |
| 5,052,947 | 10/1991 | Brodie et al. | 439/607 |
| 5,066,248 | 11/1991 | Gaver, Jr. et al. | 439/578 |
| 5,098,314 | 3/1992 | Castagna et al. | 439/578 |
| 5,281,762 | 1/1994 | Long et al. | 174/78 |
| 5,389,012 | 2/1995 | Huang | 439/583 |
| 5,402,315 | 3/1995 | Reichle | 361/784 |
| 5,414,211 | 5/1995 | Chan | 174/36 |
| 5,691,506 | 11/1997 | Miyazaki et al. | 439/98 X |

FOREIGN PATENT DOCUMENTS

| | | | |
|---|---|---|---|
| 0 463 760-A1 | 1/1992 | European Pat. Off. | H01R 9/05 |
| 0 694 989-A2 | 1/1996 | European Pat. Off. | H01R 9/05 |

OTHER PUBLICATIONS

PCT International Search Report (see PCT Publication).

*Primary Examiner*—Kristine Kincaid
*Assistant Examiner*—William H Mayo, III
*Attorney, Agent, or Firm*—Driscoll Nina

[57] ABSTRACT

A braid termination structure having an outer ring with an inner profile for fitting over the shielding braid for electrical and mechanical engagement therewith and being affixed to a shielding shell of an electrical connector wherein the braid is positively captured in an outer ring and is fixed thereto by welding.

6 Claims, 4 Drawing Sheets

SHIELDING BRAID TERMINATION FOR A SHIELDED ELECTRICAL CONNECTOR

BACKGROUND OF THE INVENTION

1. Field of the Invention

This invention relates to shielded electrical cable and shielded electrical connectors to be affixed thereto, and in particular to the termination of the shielding braid about the electrical cable.

2. Summary of the Prior Art

When terminating shielded electrical cable, it is common to electrically couple the shielding braid of the cable to a shield member of an electrical connector or electrical device. One way of accomplishing this is to attach the braid directly to the shield by welding or soldering. Another method is to include a crimp ring that fits about the braid of the cable and may be crimped thereto such that the braid is positively retained. After crimping, the crimp ring must be commoned with the connector shield. Another known solution is to crimp the braid directly to the connector housing. This may be accomplished by providing a flange that extends from the shield that would fit beneath the braid and provide a crimp ring thereover that, when crimped, tightly fastens the braid therebetween. It is also known to join the braid to a shield flange directly, as described above, but rather than using a crimp ring, a second ring is used that is press fit thereupon, thereby captivating the braid therebetween.

While the aforementioned concepts work reasonably well to form an electrical connection with the braid, they are not altogether satisfactory in some applications, such as with miniature connectors. For example, it is difficult to reliably common and affix a crimped ring to a shield of a connector as the outer surface of the crimp ring has been distorted by the crimping operation and the crimping does not always yield a positive engagement with the braid as the braid is typically flexible and not supported underneath. In addition, welding of the braid directly to the shield typically results in only an electrical connection occurring over only a portion of the braid and the heat produced may be sufficient to damage the shielding braid of the smaller cables associated with miniature connectors. While the concept of press fitting a ring directly about a braid spread over a flange of a shield works admirably, it does have a problem in that it is not always possible to form a flange in the connector housing. Especially in miniature connectors it may not be possible for the shielding to provide adequate structural integrity. What is needed is a way to reliably engage the braid, desirably over a large portion thereof. The structure used should be simple to use and adaptable to many operations without requiring excessive high precision tolerancing.

SUMMARY OF THE INVENTION

These and other objects are accomplished by providing a braid termination structure that reliably engages the braid and is easily fixed to a shielding shell. One desirable braid termination structure comprises an inner ring having an inner profile for receiving an insulating sleeve surrounding a conductor of a shielded cable therethrough and an outer profile for fitting under a shielding braid of the cable, and an outer ring having an inner profile for fitting over the shielding braid upon the first ring in a press fit manner, where the braid is positively captured therebetween. Another desirable termination structure comprises an outer ring having an inner profile for fitting over the shielding braid of a cable such that the braid is in contact with the inner surface and a plurality of welding spots are established about the outer ring such that the braid is reliably joined to the inner surface.

It is a further object of this invention to provide means for reliably and electrically coupling the shielding braid of a shielded cable to the shield member incorporated about an electrical device.

This object is accomplished by providing a shielded electrical connector for terminating a shielding cable, where the shielding cable includes a conductor having an insulating sleeve thereabout with a shielding braid extending therealong, the connector comprising a housing having a contact therein for terminating the conductor, a shield member about said housing and a braid termination structure that includes an outer ring having an inner profile for fitting over the shielding braid in a manner whereby the braid is engaged therewith, the outer ring further including an outer surface that is fixable to the shield of the connector, whereby the shield of the braid and the shield of the connector are reliably coupled together.

It is an advantage of this invention that the shielding braid may be reliably engaged. It is another advantage of this invention that the shielding braid may be reliably engaged in a simple manner without the need to crimp. It is still another advantage of this invention that the outer ring may take on a shape other than circular. It is yet another advantage that the structure would not require accurate placement upon a shield of the connector.

DETAILED DESCRIPTION OF THE PREFERRED EMBODIMENT

Figure 1:
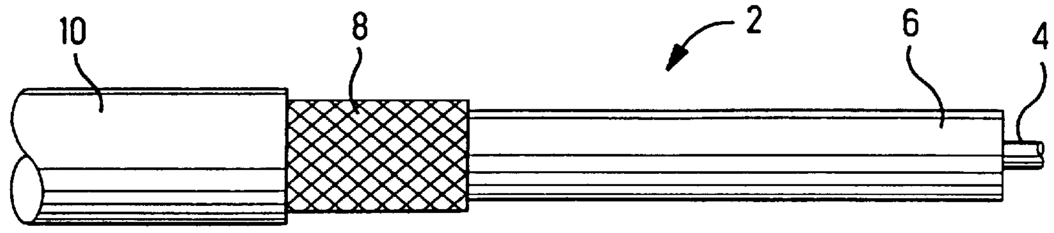
FIG. 1 is a side view of a shielded cable prepared for termination.

With reference first to FIG. 1, a shielded cable is shown generally at 2. The shielded cable 2 includes a conductor 4 extending within an insulating sleeve 6 that is surrounded by a shielding braid 8. The shielding braid 8 is overlaid by a protective jacket 10.

Figure 2:
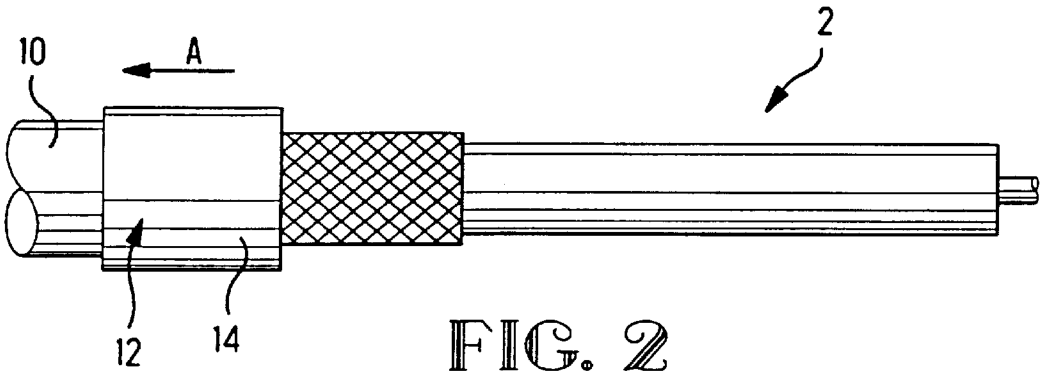
FIG. 2 is a side view of the cable of FIG. 1 showing a second ring of a braid termination structure placed thereupon.

With reference now to FIG. 2, the cable 2 is shown with a outer ring 12 thereabout that is placed upon the cable 2 by displacement in the direction of arrow A such that it is received over the cable jacket 10 through an inner profile thereof. In this embodiment, an outer surface 14 of the outer ring 12 is wider than the corresponding width of the protective jacket 10. This is advantageous when the structure is to be affixed to a shield of a connector thereby insuring that the cable does not interfere with positioning, as will become apparent in the description below.

Figure 3:
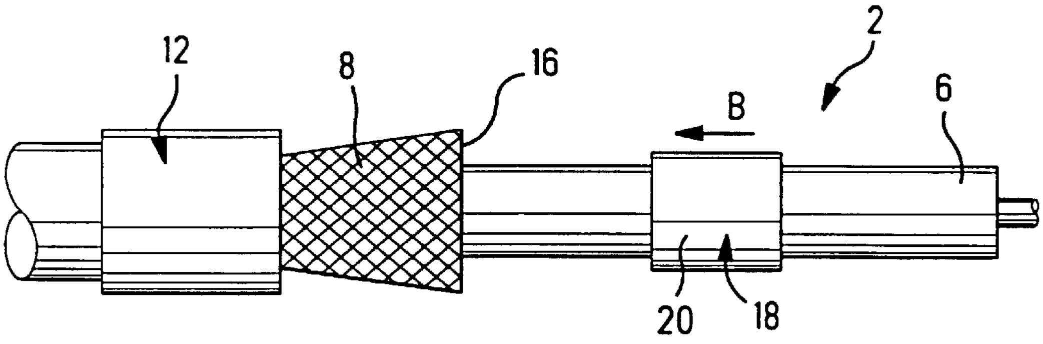
FIG. 3 is a side view of FIG. 2 showing a first inner ring of the braid termination structure disposed thereupon.

With reference now to FIG. 3, the cable 2 is shown having a front edge 16 of the shield 8 that is flared outwardly in an inverted cone-like manner. The flaring of the braid 8 separates the front edge 16 from the insulating sleeve 6. An inner ring 18 is fitted over the insulating sleeve 6 which passes through an inner profile thereof as the ring 18 is advanced in the direction of arrow B. By properly selecting an outer profile for the inner ring 18 the inner ring 18 will fit under the braid 8.

Figure 4:
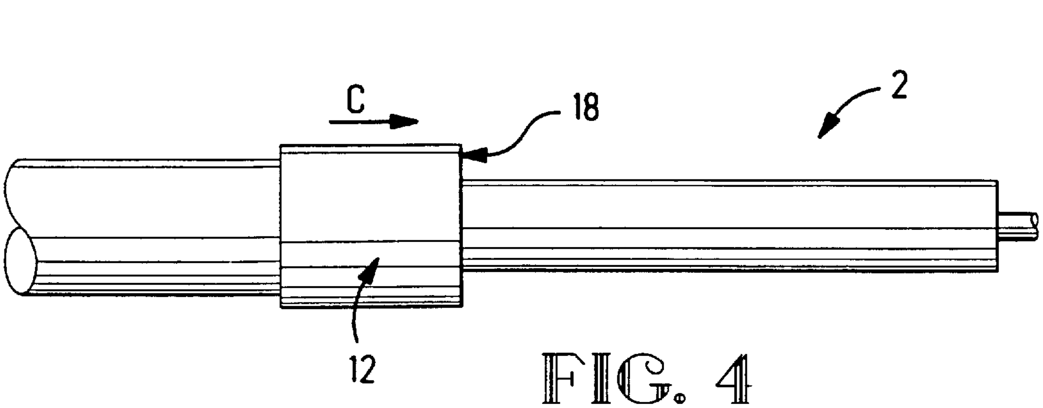
FIG. 4 is a side view of the cable of FIG. 1 showing the braid termination structure attached thereto.

With reference now to FIG. 4, once the inner ring 18 has been fitted underneath the braid 8, the outer ring 12 may be advanced in the direction of arrow C such that the inner profile of the outer sleeve 12 receives the braid 8 and the inner sleeve 18 thereunder. In the position shown, the braid 18 is positively captured between the two rings 12,18. As the braid 8 has been uniformly spread out upon the outer profile 20 of the inner ring 18, the telescopic press fitting provides engagement of the braid 8 over substantially all of the braid 8, thereby providing a uniform mechanical engagement of the braid 8 and a substantial electrical/mechanical interconnection. As it is not necessary to crimp either the inner ring 18 or the outer ring 12, these rings 18,12 may be made from relatively hard material that has good electrical properties and welding properties for welding to a connector shield, as described below. As the material of the rings 12,18 is hard, the press fitting does not deform either of the rings 12,18 and instead it is the relatively softer braid that deforms leaving the structural integrity of the outer surface 20 of the outer ring 12 and the conductors 4 intact.

Figure 5:
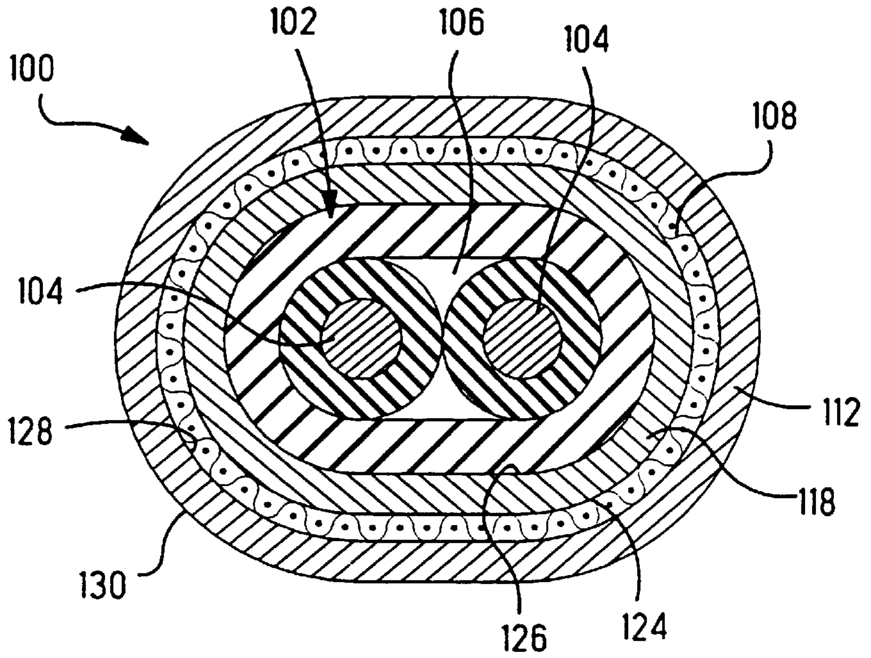
FIG. 5 is a cross-sectional view of a braid termination structure similar to that shown in FIGS. 2–4, wherein the braid termination structure has an oval cross-section.

With reference now to FIG. 5, an alternative embodiment of the braid termination structure is shown generally at 100. While in the afore described structure rings 12,18 would conveniently have a circular cross-section, it is also possible to utilize rings of different cross-section, as is seen here. This is especially advantageous where a cable 102 incorporating multiple conductors 104 within a singular or discrete insulating jacket 106 are used. This concept may also be applicable to twisted-pair cable. While all of the aforementioned structure and procedures are once again used, this time the rings take on an oval cross-section. Once again, an outer ring 112 cooperates with an inner ring 118 to positively capture a shielding braid 108 therebetween. As can be seen in FIG. 5, an inner profile 124 of the inner ring 118 is sized to pass an insulating sleeve 106 of a cable 102 therethrough. The inner ring 118 further includes an outer profile 126 that fits underneath the braid 108. The outer profile 126 may include serrations, dimples or any other features that would enhance engagement of the braid or the outer ring 112. The outer ring 112 includes an inner profile 128 that telescopically fits over the braid 108 disposed upon the inner ring 118, thereby captivating the braid 108 between the outer surface 126 and the outer ring 112. As the outer ring 112 does not have to be crimped, an outer surface 130 thereof remains in tact and of the desired shape so that it may be easily incorporated into an electrical connector, as described below.

Figure 6:
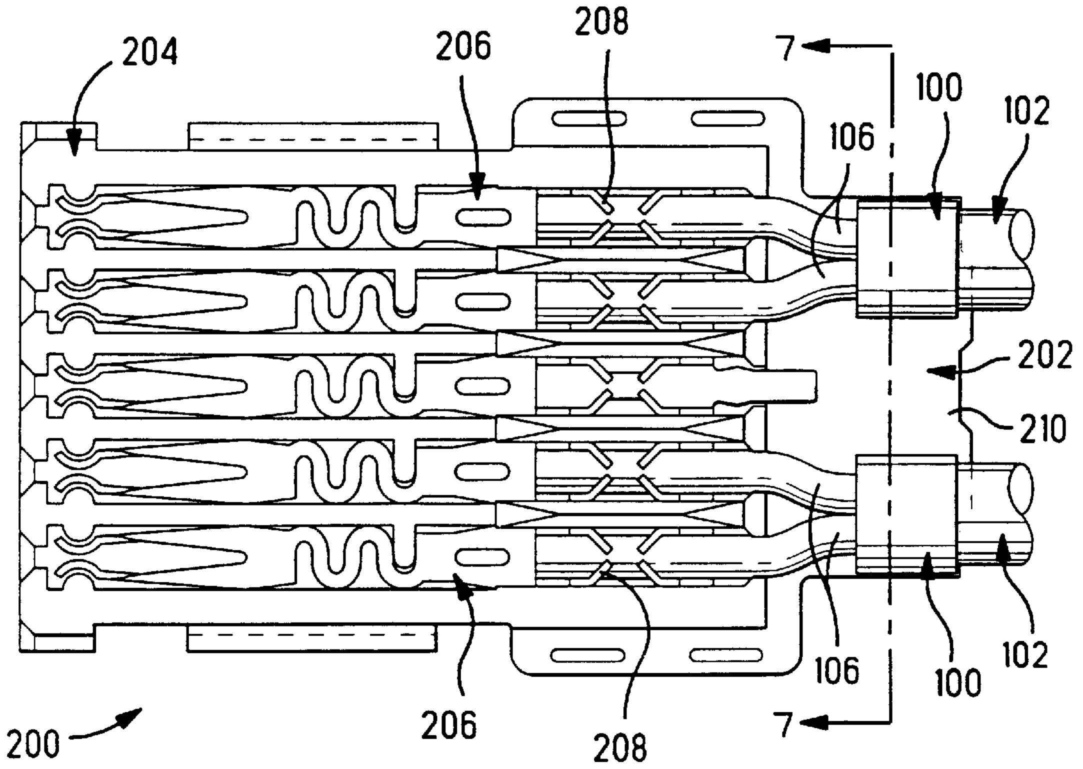
FIG. 6 is a top view of a bottom half of a shielded electrical connector incorporating the present invention and having the braid termination structure affixed thereto.
Figure 8:
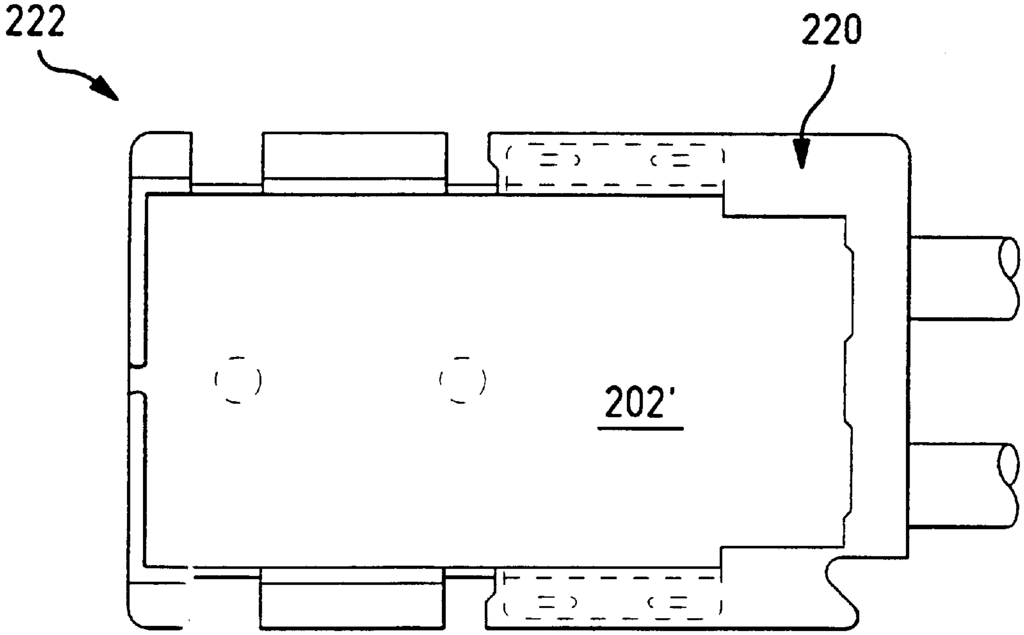
FIG. 8 is a top view of the fully assembled electrical connector according to the present invention.

With reference now to FIGS. 6 and 8, an electrical connector similar to that disclosed in PCT/IB95/0035 is illustrated. In the previously disclosed connector, seat portions, incorporated directly into the shielding of the connector, were used to common the shielding to the braid. As seen in FIG. 6, a lower half of the connector is shown generally at 200. This connector includes a shielding plate 202 upon which an insulative housing section 204 is disposed. A plurality of contacts 206 are received within the housing 204. These contacts 206 include a conductor engaging end 208 for terminating the conductors within the insulating sleeve 106 of the cables 102 in an insulation displacement manner. A plate portion 210 of the shield 202 extends rearward beyond the housing end 204 to form a platform for affixing the braid termination structure 100 thereto. The platform 210 may include formed seats for receiving the braid termination structure 100 in a particular location or advantageously, as shown, the platform 210 may remain basically flat allowing the braid termination structure 100 to find a desired position thereupon, thereby providing compensation for manufacturing tolerances by not requiring the braid termination structure to be precisely positioned thereupon. As the braid termination structure 100 is formed in an oval cross-section, the outer surface includes opposing and basically flat portions that correspond to the surface of the platform 210. The braid termination structure 100 is then easily and reliably affixed to the platform portion 210 of the shield 202 by such processes as resistance or laser welding.

Figure 7:
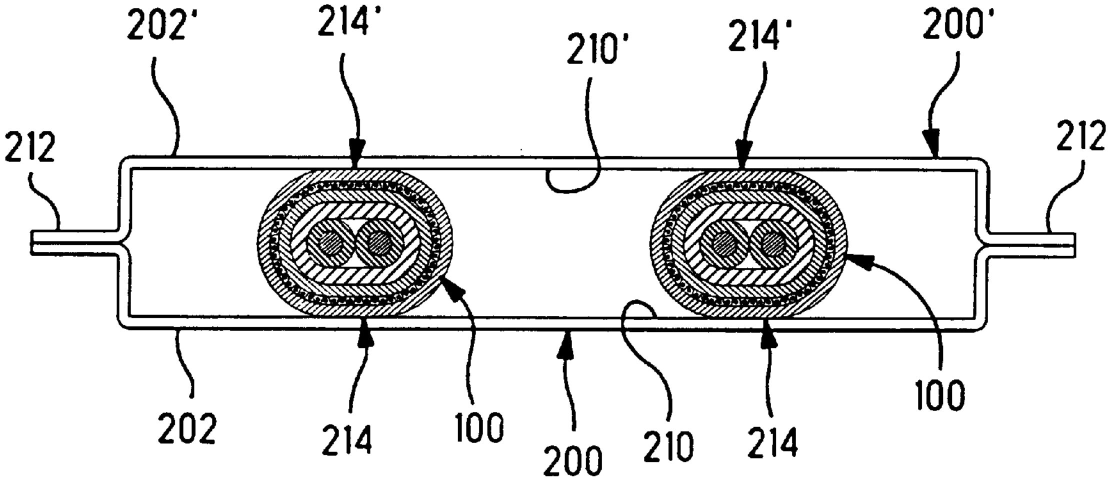
FIG. 7 is a partial sectional view of the connector of FIG. 6 taken along line 7—7.

With reference now to FIG. 7, an upper connector half 200' that corresponds to the lower half 200 is shown affixed thereto. The braid termination structure 100 is sandwiched between the rear platforms 210, 210' of the upper and lower shields 202, 202'. While the connector halves 200,200' are joined together along connector flanges 212 by welding, the braid termination structure is additionally affixed to the platforms 210,210' at points 214,214'. It is important to note that as the braid termination structure has not been crimped the overall thickness of the connector may be reliably controlled by the thickness of the structure 100. In addition, the braid termination structure 100 provides additional structural support to the rear of the connector when it is affixed to the platforms 210,210' by affixing the braid termination structure 200 about the cable as described above. As seen in FIG. 8, once the connector has been assembled as shown in FIG. 7, a rear housing 220 may be overmoulded directly about the shields 202,202' to form an electrical connector 222. If desired, the material used to form the rear housing 220 may be allowed to flow around the braid termination structures 100 to at least partially embed the structures 100 therein, such that the structures 100 could serve as additional anchors for the rear housing 220. Even embedding the structures 100 within the rear housing 220 material would not effect the electrical continuity as that is established between the inner and outer rings 112,118 and the outer surface of the outer ring 112 with the connector shield prior to moulding.

Figure 9:
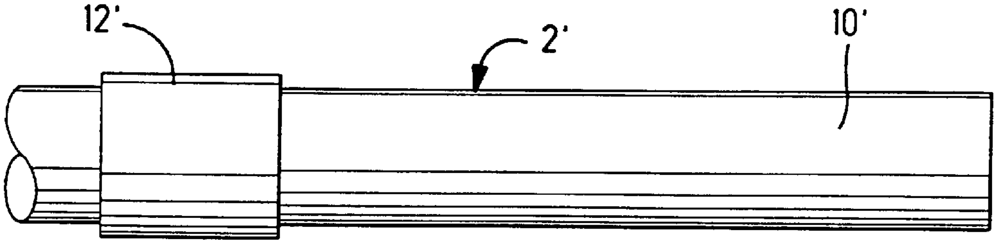
FIG. 9 is a side view of a shielded cable similar to that of FIG. 1 with an outer ring of an alternative of the present invention disposed thereupon.
Figure 10:
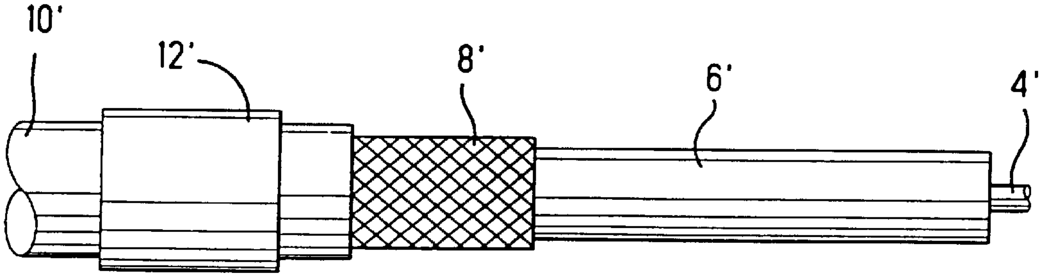
FIG. 10 is a side view of the assembly of FIG. 9 showing the cable prepared for termination.

With reference now to FIGS. 9 and 10, a cable 2' is shown that generally corresponds to the cable 2 shown and described above with reference to FIGS. 1–4. The shield at cable 2' includes a conductor 4' that extends within and insulating sleeve 6' that is surrounded by a shielding braid 8' all of which is overlaid by a protective jacket 10'. The cable 2' is terminated such that the conductor 4' and insulating sleeve 6' extend beyond a portion of the shielding braid 8' both of which are exposed by removing a portion of the protective jacket 10'. An outer ring 12' is formed of a conducted material and slipped over the outer jacket 10'. Desireably, the inner surface configuration of the outer ring 12' is sufficiently large that the outer ring 12' easily slips over the jacket 10'. The outer ring 12' may be disposed on the cable 2' prior to removal of the outer jacket 10' as shown in FIG. 9 or after removal of the outer jacket 10', as shown in FIG. 10. It may be desirable to have the outer ring 12' formed as a split ring that is then compressed into final form.

Figure 11:
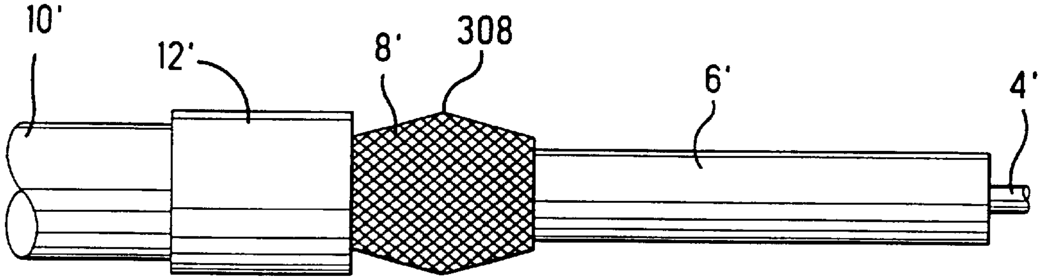
FIG. 11 is a side view of the assembly corresponding to FIG. 10 showing the shielding braid deformed for engagement with the outer ring.

With reference now to FIG. 11, once the protective jacket 10' has been removed the shielding braid 8 may be deformed such that an enlarged waist 308 is formed therein where the enlarged waist extends outward such that the waist 308 will interfere with the inner profile of the outer ring 12' when the outer ring is displaced thereover. This provides one way of bringing the braid 8' into contact with the ring 12' . The waist 308 is typically formed by pushing the braid 8' in the direction of arrows C. Once the waist 308 has been formed the outer ring 12' is displaced in the direction of arrow D such that the shielding braid 8' fits underneath the outer ring 12' within the inner profile thereof such that it is in contact therewith. As the shielding braid 8' is made up of flexible material, for example multiple strands of woven individual conductors or a foil, possibly with a drain wire therein there is some resiliency such that as the outer ring of 12' is brought thereover the waist 308 resiliently remains in contact with the inner profile of the outer ring 12'.

Figure 12:
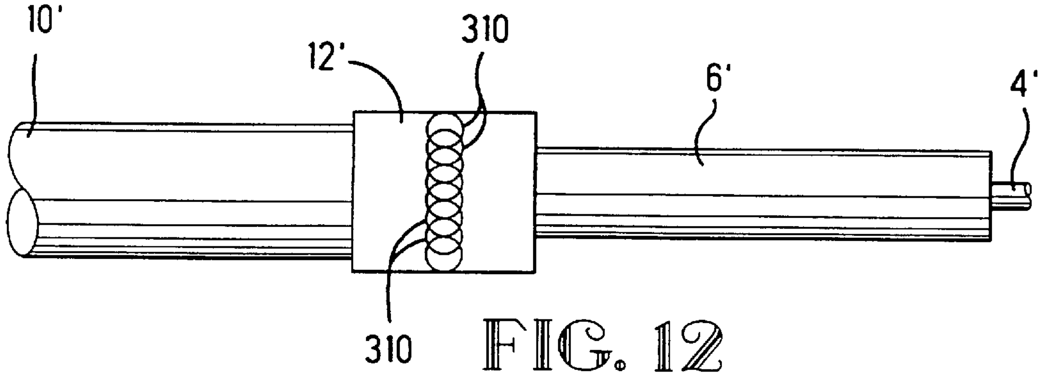
FIG. 12 is a side view of the assembly of FIG. 11.

With reference now to FIG. 12, the outer ring 12' is brought into reliable physical and electrical engagement with the shielding braid 8' by forming a plurality of spot welds 310 about the periphery thereof. The spot welds 310 may be formed by laser welding or normal resistance welding. Where the shielding braid 8' is made up of multiple distinct strands woven together the multiple spot welds 310 will engage a sufficient number such that reliable electrical inner connection is formed therebetween. Advantageously, the spot welds 310 may overlap as shown. By optimizing the welding procedure, the outer ring 12' may be joined to the braid 8' without significant deformation of the outer ring 12' enabling the outer ring 12' to be used as a structural member of the electrical connector, as already described with respect to FIGS. 6–8.

Advantageously then a reliable and effective engagement of the shielding braid is provided for an electrical connector. The braid termination structure may be positioned upon shielding members of a connector in a manner that eliminates the need for precise positioning an enhances the overall structural integrity of the connector. The braid termination structure may take on various profiles enabling easy attachment with the connector shielding and, as crimping is not required to establish the electrical interconnection, the possibility of damaging the cable is reduced.

We claim:

1. A shielded electrical connector for a shielded cable, comprising at least one contact terminated to an insulated conductor of a shielded cable where the at least one contact is disposed within an insulative housing that is surrounded by shielding, the connector characterized in that the shielded cable is terminated with shielding termination structure having an outer ring and having an inner surface against which a shield of the shielded cable is held in physical and electrical contact, the shielding termination structure being characterized in that the shield of the shielded cable is held in contact therewith as a result of welding therebetween and said shielding termination structure being electrically connected to the shield of the shielding cable.

2. The shielding electrical connector of claim 1, further characterized in that a plurality of welding spots are disposed about a circumference the of outer ring.

3. The shielded connector of claim 2, further characterized in that the welding spots overlap.

4. The shielded connector of claim 2, further characterized in that the welding spots overlap about the entire periphery of the outer ring.

5. The shielded electrical connector of claim 1, further characterized in that the outer ring is a solid continuous body.

6. The shielded electrical connector of claim 1, further characterized in that the outer ring is round.

* * * * *